United States Patent
Moffatt (10) Patent No.: US 8,014,023 B2
(45) Date of Patent: Sep. 6, 2011

(54) SYSTEM AND METHOD FOR IDENTIFYING ATTRIBUTES OF A PRINTED IMAGE

(75) Inventor: John Moffatt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

(21) Appl. No.: 10/464,224

(22) Filed: Jun. 18, 2003

(65) Prior Publication Data

US 2004/0257593 A1    Dec. 23, 2004

(51) Int. Cl.
*G06K 15/02* (2006.01)

(52) U.S. Cl. .................................. 358/1.9; 358/1.18

(58) Field of Classification Search ................. 358/1.9, 358/1.11–1.18; 707/10, 103 R; 348/222.1; 382/261; 400/88; 715/255

See application file for complete search history.

(56) References Cited

U.S. PATENT DOCUMENTS

| | | | |
|---|---|---|---|
| 6,115,133 A * | 9/2000 | Watanabe | 358/1.15 |
| 6,182,083 B1 * | 1/2001 | Scheifler et al. | 707/103 R |
| 6,381,418 B1 | 4/2002 | Spurr et al. | 396/310 |
| 6,426,771 B1 * | 7/2002 | Kosugi | 348/222.1 |
| 6,529,908 B1 * | 3/2003 | Piett et al. | 707/10 |
| 6,773,177 B2 * | 8/2004 | Denoue et al. | 400/88 |
| 6,834,124 B1 * | 12/2004 | Lin et al. | 382/261 |
| 7,095,526 B1 * | 8/2006 | Housel | 358/1.18 |
| 7,277,192 B2 * | 10/2007 | Kotani et al. | 358/1.13 |
| 7,281,209 B2 * | 10/2007 | Nara et al. | 715/255 |

FOREIGN PATENT DOCUMENTS

JP    2003058824 A  *  2/2003

* cited by examiner

*Primary Examiner* — Twyler L Haskins
*Assistant Examiner* — Lennin Rodriguez (57) ABSTRACT

Memorializing a printed image, including detecting at least one attribute associated with the originally printed image, the attribute identifying a user-selectable feature on a print device, generating an image attribute tag after a request to print has been communicated to the print device, the image attribute tag including a description of the detected attribute, and printing the image attribute tag.

19 Claims, 5 Drawing Sheets

SYSTEM AND METHOD FOR IDENTIFYING ATTRIBUTES OF A PRINTED IMAGE

TECHNICAL FIELD

The present invention is generally related to printing images and, more particularly, is related to a system and method for identifying attributes of a printed image.

BACKGROUND

A variety of print devices are available for the printing of images. After the images are printed, the user receives a print of the image. The user may retrieve the image directly from the print device itself. Or, the user may receive the image via an intermediary party, such as when the user receives printed photographic images from a print shop. Once the user is in possession of the printed image, the user typically uses the printed image for some intended purpose.

The user, after receiving the printed image, may desire to have the image re-printed. In some instances the image quality of the originally printed image is acceptable, and the user merely desires a number of duplicate printed images. In other instances, the user may wish to alter some characteristic of the image. For example, a size change, a media change, and/or a color or tone adjustment may be desired for the re-printed image. For convenience, such characteristics or features of a printed image are referred to herein as an "attribute" of the printed image.

In many instances, the user only has the originally printed image itself. The user does not have information regarding to some or all of the attributes of the originally printed image. Thus, when the user prints additional images, the user must "guess" at the printer setting so that a new image is printed having desirable characteristics. The process of obtaining additional printed images is further complicated when the image printing is performed by an intermediary party, such as when the user returns a printed photographic image or negative to a print shop for reprints of a photograph.

When an image is stored electronically, many attributes of the image can be stored in a data file. However, such a data file does not include the settings of the print device used when the originally printed image was printed. Furthermore, such a data file is in electronic format. Thus, a program configured to access the data file and configured to present the attributes to the user must be operated before the user can obtain information from the data file. If the user does not have access to such a program, the information in the data file is not retrievable.

Accordingly, there is a need for a user to have access to printed image attributes. Access to such attributes facilitates re-printing of additional images.

SUMMARY

The present invention provides a system and method which prints information of interest relating to a printed image. Briefly described, one embodiment comprises a processor configured to receive information corresponding to at least one attribute associated with the printed image, a memory configured to store the information corresponding to the attribute; an image information database residing in the memory and configured to store the information corresponding to the attribute when the attribute relates to the printed image, a printer attribute database residing in the memory and configured to store the information corresponding to the attribute when the attribute relates to a selectable feature of a print device used to print the printed image, wherein the processor generates an image attribute tag upon detecting a print command to print the printed image, and wherein the image attribute tag is communicated to the print device so that the image attribute tag is printed.

Another embodiment is a method for memorializing a printed image, the method comprising detecting at least one attribute associated with the printed image, the attribute identifying a user-selectable feature on a print device, generating an image attribute tag after a request to print has been communicated to the print device, the image attribute tag including a description of the detected attribute, and printing the image attribute tag.

Another embodiment is a method for re-printing an image corresponding to a printed image, the method comprising receiving a printed image attribute tag associated with the printed image, the image attribute tag having a textual description of at least one attribute corresponding to a user-selectable feature of a print device specified during printing of the printed image; setting the selectable feature of the print device, the selectable feature corresponding to the attribute; printing an image, the image corresponding to a re-printing of the printed image.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention.

DETAILED DESCRIPTION

Figure 1:
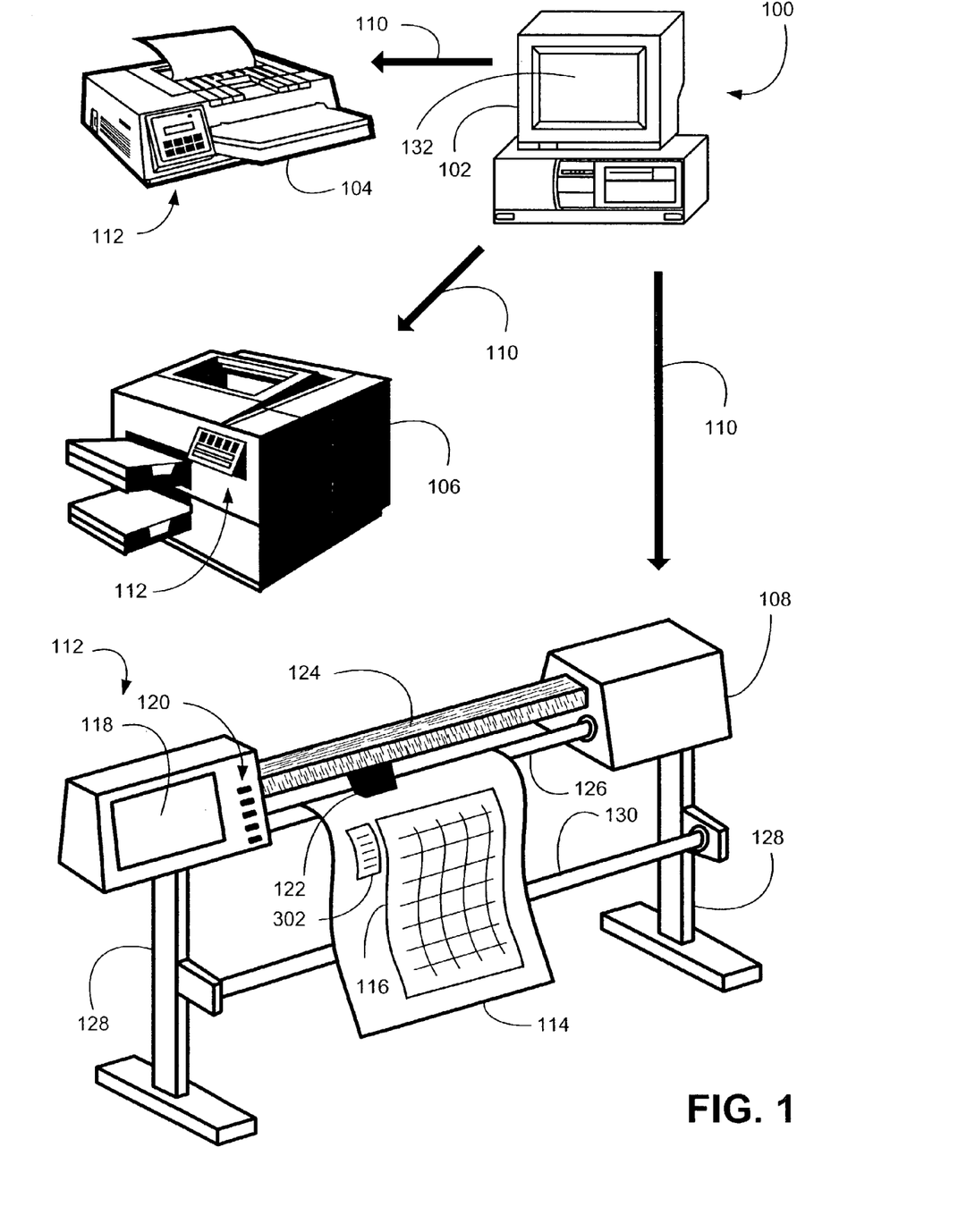
FIG. 1 is a block diagram illustrating one embodiment of a printed image attribute system in accordance with the present invention.

FIG. 1 is a block diagram illustrating one embodiment of a printed image attribute system 100 in accordance with the present invention. The exemplary embodiment of the printed image attribute system 100 includes a processing system 102 and at least one print device 104, 106, 108. It is understood that embodiments of the present invention may be implemented in any suitable device configured to print images and/or configured to control printing of images. Non-limiting examples of such devices include, but are not limited to, processors, personal computers, copy machines, scanners, laser printers, ink jet printers, commercial printers, film developers/processors, etc.

The exemplary embodiment of the printed image attribute system 100 is configured to communicate the image to be printed in an electronic format, indicated by the arrow-lines 110, to one of the print devices 104, 106, 108. The print devices 104, 106, 108 are configured to have at least one user-selectable feature that corresponds to an attribute of the printed image. An attribute selection interface 112, having a display and/or one or more controllers, may be included on the print device 104, 106, 108. For example, but not limited to, the user may select the media type that the image is to be printed on, tone and/or color characteristics of the printed image, size that the image is to be printed, paper size, image size, scale factor, image orientation (e.g.: landscape or portrait), image rotation (degrees or auto-rotation), print quality (best, normal, fast, etc.), duplex printing, paper order, halftoning, PostScript commands, color correction settings, paper source (tray), mirror image printing, status of a paper cutter (on/off on a rolled sheet media), margin settings or other attributes of interest. In some instances, a parameter associated with an attribute may be expressed as a number, value or the like, referred to herein as "attribute parameter" for convenience. Some attributes and/or attribute parameters may be automatically set to default values by the print device. It is understood that any information of interest, or any suitable user-selectable feature, of a print device and/or an image may be defined as an attribute and/or attribute parameter.

Prior to printing, the attributes and/or attribute parameters selected by the user, and any applicable default attributes and/or attribute parameters of interest, are detected by the printed image attribute system 100, as described in greater detail herein. These detected attributes and/or attribute parameters are communicated back to the processing system 102 so that an image attribute tag 302 (FIG. 3) having the detected and/or default print device attributes and/or attribute parameters may be generated.

Figure 3:
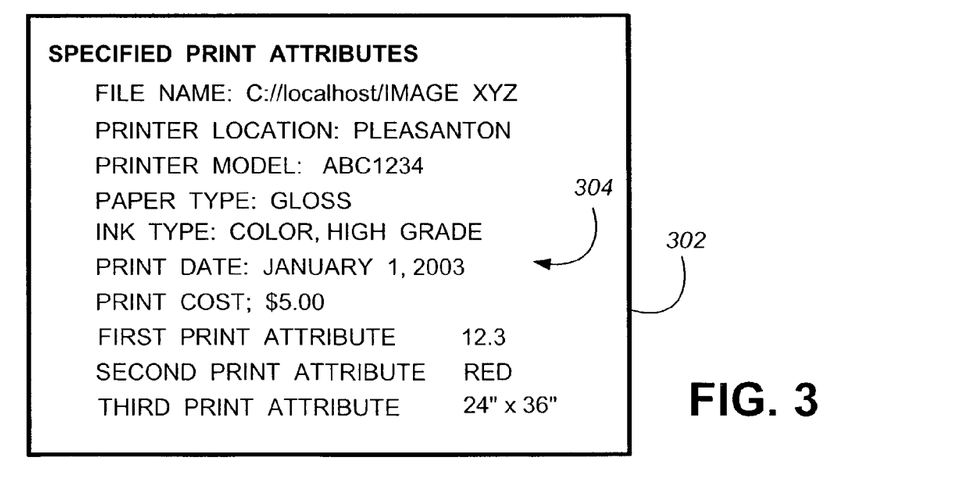
FIG. 3 is an exemplary printed image attribute tag prepared by embodiments of the present invention.

Other attributes of interest, such as the name of the user (or another suitable identifier), information relating to the print device (such as manufacturer, model type or number, or print device location, print device address), date of printing, cost of printing, information relating to the originally printed image (such as image file name, location, or date of creation) and/or other information of interest, may be included in the image attribute tag 302. It is understood that any information of interest may be included as an attribute and/or attribute parameter in an image attribute tag 302 generated by embodiments of the present invention.

Once the image attribute tag 302 has been generated, the print device prints the image and the image attribute tag 302. The printed image and the printed image attribute tag 302 is then obtained by or provided to the user. Accordingly, the user has a way of understanding the attributes and/or attribute parameters associated with an originally printed image.

The printed image attribute tag 302 provides a way for the user to print additional images at a later time, referred to as a "re-printed image" or "re-print image" for convenience. For example, the user may give the originally printed image (hard-copy or electronic data format) and the printed image attribute tag 302 to an intermediary party with a request for one or more re-printed images. The intermediary party then is able to provide re-printed images that more closely approximate the originally printed image because the intermediary party can set the printer attributes and/or attribute parameters to correspond to the attributes and/or attribute parameters of the originally printed image.

Furthermore, the image attribute tag 302 provides a way for the user to alter characteristics of a re-printed image. For example, the user may desire to adjust the size, color and/or tone of the re-printed image. The user, knowing the attributes and/or attribute parameters of the original printed image (as specified by the image attribute tag 302 of the originally printed image), has a basis upon which to specify changes in the attributes and/or attribute parameters of the re-printed image. Such changes in attributes and/or attribute parameters are easily communicated to an intermediary party who is preparing the re-printed image by specifying new attribute parameters and/or by specifying incremental changes to attribute parameters.

A simplified illustrative example of generating and printing an image attribute tag 302 for an originally printed image is now provided. It is understood that the simplified example is applicable to any suitable print device configured with embodiments of the present invention.

Print device 108 is a simplified illustration of a large format print device. Such large print format devices are configured to print a large size image on a large sheet of medium 114. The large size image may be a map 116, poster, advertisement or the like. Often, such large size images are printed in color. For convenience, the image attribute tag 302 is illustrated as being printed in the margin next to the map 116.

Print device 108 includes an attribute selection interface 112, having a display 118 and/or one or more controllers 120 configured to be actuated by the user to select an attribute and/or to adjust an attribute parameter. The paper 114 is typically provided from a large roll of media (not shown). As the paper 114 advances through the print device 108 during printing, a print head 122 slides along a track 124 so that ink, toner or the like is applied to the sheet of paper so that the image is printed on an incremental, line-by-line basis. In one embodiment, the print head 122 has a plurality of ink jet cartridge units having ink application nozzles. An upper roller 126 holds the portion of the paper sheet 114 currently being printed in proper position so that the print head 122 may properly apply ink, toner or the like to the paper 114. The print device 108 may be extended upwards by supports 128, or may be placed on a suitable elevated surface, so that the sheet of paper 114 moves downward as the sheet of paper is incrementally advanced on a line-by-line basis during printing. A second roller 130 may be provided to further support the sheet of paper 114 or to act as a take-up mechanism so that the printed sheet 114 is conveniently rolled-up upon completion of the printing process.

As noted above, the image attribute tag 302 is illustrated as being printed in the margin next to the map 116 for convenience. Depending upon the size of the printed image, the image attribute tag 302 may be printed before or after the printed image, depending upon the embodiment of the printed image attribute system 100. In another embodiment, the user may use the attribute selection interface 112 to specify a position for printing the image attribute tag 302.

Figure 2:
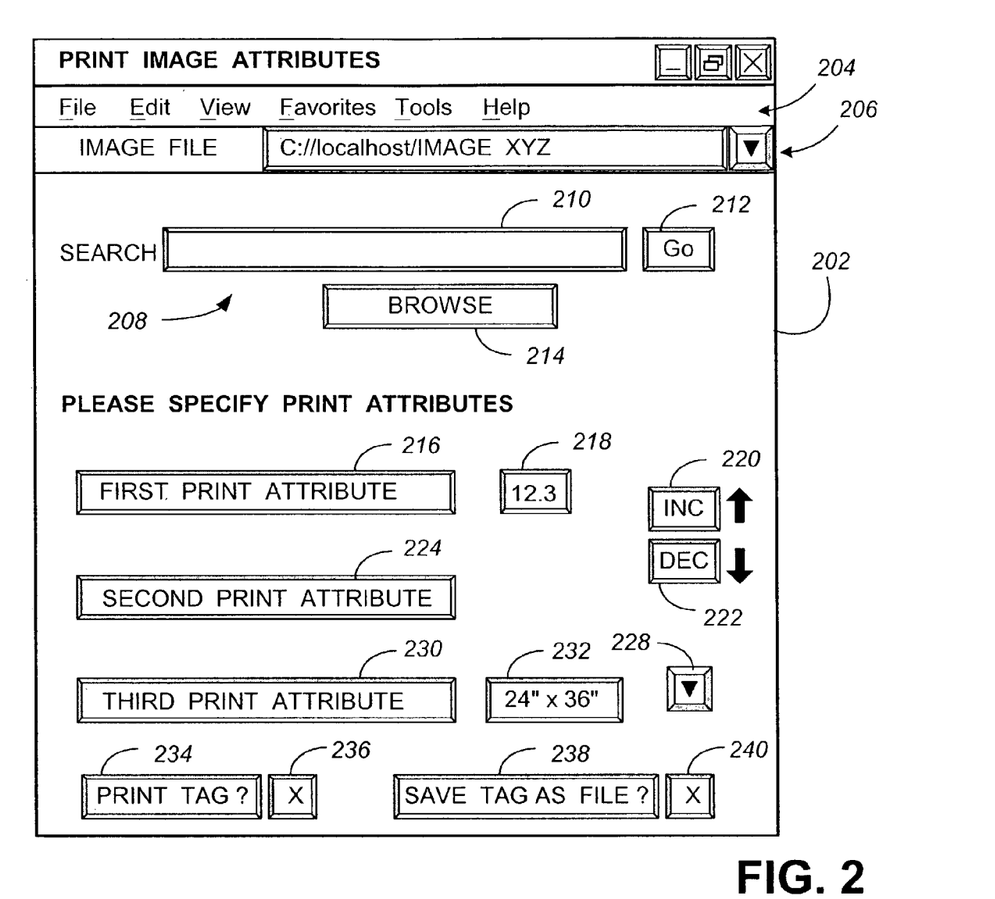
FIG. 2 is a block diagram illustrating an exemplary attribute selection menu used by an embodiment of a print device.

FIG. 2 is a block diagram illustrating an exemplary attribute selection menu 202 used by an embodiment of a print device. The menu may be displayed on a display 118 (FIG. 1), or on a display 132 (FIG. 1) of the processor system 102. The simplified exemplary attribute selection menu 202 is described herein to illustrate operation of one embodiment of the present invention.

The exemplary embodiment of the attribute selection menu 202 includes a tool bar 204 that allows the user access to various print features and which controls the particular menu currently displayed. One illustrated embodiment of attribute selection menu 202 includes an optional file selection tool 206 so that the user can specify the image file that contains the image that is to be printed. Thus, an electronic image can be conveniently retrieved from any suitable accessible memory location.

One embodiment of an attribute selection menu 202 includes a search tool 208. The user can enter a phrase or word of interest into the region 210, actuate the "Go" button 212 with a mouse or the like, such that an attribute and/or attribute parameter is made available for selection and/or specification. A "browse" button 214 may also be provided such that a pull-down menu is displayed (not shown) such that an attribute and/or attribute parameter is made available for selection and/or specification.

Attribute selection menu 202 may also include one or more attributes and/or attribute parameters that are always displayed. Such attributes and/or attribute parameters are of the type that should be specified for every printed image, or of the type that are frequently changed or adjusted by the user. For example, the first print attribute is identified at bar 216. The attribute parameter value, illustrated as equal to 12.3, is displayed at bar 218. The user may conveniently increase the attribute parameter value of the first print attribute by actuation button 220, or may decrease the attribute parameter value by actuating the button 222.

A second print attribute is identified at bar 224. The attribute parameter value, illustrated as equal to "red", is displayed. The user may conveniently change the attribute parameter value of the second print attribute by actuation buttons 220, 222, or may overtype the attribute parameter value directly, or select another attribute parameter value from a pull down menu (not shown) by actuation button 228.

A third print attribute is identified at bar 230. The attribute parameter value, illustrated as equal to a size of paper 24×36 inches to indicate paper size, is displayed at bar 232. The user may conveniently change the attribute parameter value of the third print attribute by actuation buttons 220, 222, or may overtype the attribute parameter value directly, or select another attribute parameter value from a pull down menu (not shown) by actuation button 228.

In other embodiments, one or more of the displayed attributes and/or attribute parameters are selectable or adjustable by actuation of controllers 120 (FIG. 1) configured to be actuated by the user (or an intermediary party).

It is understood that the above-described attribute selection menu 202 is provided to facilitate a description of the present invention. Any number or type of attribute selection menu may be employed. Furthermore, any suitable attribute and/or attribute parameter may be displayed, selected and/or adjusted via an attribute selection menu and/or controllers 120. Thus, the present invention is not limited by the specific nature of an attribute selection menu 202 and/or controllers 120.

Other embodiments of the present invention are implemented in print devices that do not utilize an attribute selection menu 202. Such embodiments provide alternative ways for the user to select and/or specify attributes or attribute parameters. For example, one embodiment employs a plurality of pre-labeled actuators that identify attributes or attribute parameters. Thus, the user actuates the actuators to select and/or specify attributes or attribute parameters. It is understood that the present invention is equally applicable to any form of print device that provides for user selection and/or specification of attributes or attribute parameters, either directly and/or through an intermediary device.

In one embodiment, the printing of an image attribute tag 302 is a user-selectable feature. If the print tag option is selected, the image attribute tag 302 is printed. If the print tag option is not selected, the image attribute tag 302 is not printed. For example, bar 234 queries the user if the image attribute tag 302 is to be printed. If the user checkmarks, actuates or otherwise affirmatively responds via button 236 or another suitable device, the image attribute tag 302 is printed. In this example, the "x" indicates that the image attribute tag 302 will be printed. Any suitable way of querying the user, and/or indicating the status of whether the image attribute tag 302 will be printed, including a physical actuator, may be implemented by embodiments of the present invention.

In another embodiment, the saving of an image attribute tag 302 as an electronic data file is a user-selectable feature. If the save tag option is selected, the image attribute tag 302 is saved, and/or attached to, or associated with, the print image data for later reference. If the save tag option is not selected, the image attribute tag 302 is not saved. For example, bar 238 queries the user if the image attribute tag 302 is to be saved. If the user checkmarks, actuates or otherwise affirmatively responds via button 240 or another suitable device, the image attribute tag 302 is saved. In this example, the "x" indicates that the image attribute tag 302 will be saved. Any suitable way of querying the user, and/or indicating the status of whether the image attribute tag 302 will be saved, including a physical actuator, may be implemented by embodiments of the present invention.

FIG. 3 is an exemplary printed image attribute tag 302 prepared by embodiments of the present invention. The exemplary printed image attribute tag 302 includes a listing 304 of attributes and/or attribute parameter values of interest understandable to the user (and/or an intermediary party). It is understood that an image attribute tag 302 prepared by embodiments of the present invention may include any attribute and/or attribute parameter value of interest to memorialize the original printed image. Accordingly, the attributes, and their associated parameter values, may be used to facilitate the specification of attributes and/or attribute parameter values for a re-printed image.

For example, one attribute of interest may include the name of the file wherein the originally printed image resides. Thus, an attribute identifier ("File Name") and an attribute parameter (indicating the file location "C://localhost/image XYZ") is printed on the image attribute tag 302. Another attribute may be the location where the printing was performed, illustrated as the town of "Pleasanton" for convenience. Other related attributes, such as the name of the printer organization, address or phone number of the printer location, print device address, and/or the name of the employee doing the printing are other non-limiting examples of attributes and/or attribute parameters that may be of interest, and accordingly, may be printed on an image attribute tag 302.

Another attribute may identify the print device used to print the originally printed image, illustrated as having a model number of "ABC12234" for convenience. Other related attributes and/or attribute parameters, such as the name of the print device and manufacturer's name are other examples of attributes and/or attribute parameters that may be of interest, and accordingly, may be printed on an image attribute tag 302.

Another attribute and/or attribute parameter may identify the printing of the originally printed image, illustrated for convenience as being printed on a paper type having a "gloss" finish, using high grade color ink. Yet another attribute and/or attribute parameter may identify incidental attributes and/or attribute parameters associated with the originally printed image, illustrated for convenience as being printed on Jan. 1, 2003, at a cost of $5.00. Other related attributes and/or attribute parameters, such as the medium or ink manufacturer's name, and/or the catalogue name or inventory number of the medium or ink, are other examples of attributes and/or attribute parameters that may be of interest, and accordingly, may be printed on an image attribute tag 302.

Specific print device settings (attribute) and the associated setting value (attribute parameter) of interest may be specified to be included in the image attribute tag 302. Here, the above-described first attribute is printed as "12.3" for convenience.

The, above-described second attribute is printed as "RED" and the third attribute is printed as '24"×36"' for convenience.

It is understood that any suitable attribute and/or attribute parameter of interest may be included on a printed image attribute tag 302. Such attributes and/or attribute parameters may originate on a remote device. For example, a word processing program may specify margins, line spacing, pagination, page numbers and other related aspects of a word type document. A computer aided design (CAD) program may specify line colors, line thickness and other related aspects of a CAD drawing.

Such a remote device may include an embodiment of the present invention wherein an attribute and/or attribute parameter is selected for inclusion into a printed image attribute tag 302. In one embodiment, an image attribute tag 302 is prepared and communicated to the print device. In another embodiment, the image attribute tag and/or information corresponding to the attribute and/or attribute parameter of the remote device is communicated to a print device incorporating the present invention, such that an image attribute tag 302 is prepared having attributes and/or attribute parameters for both the remote device and from the print device.

Figure 4:
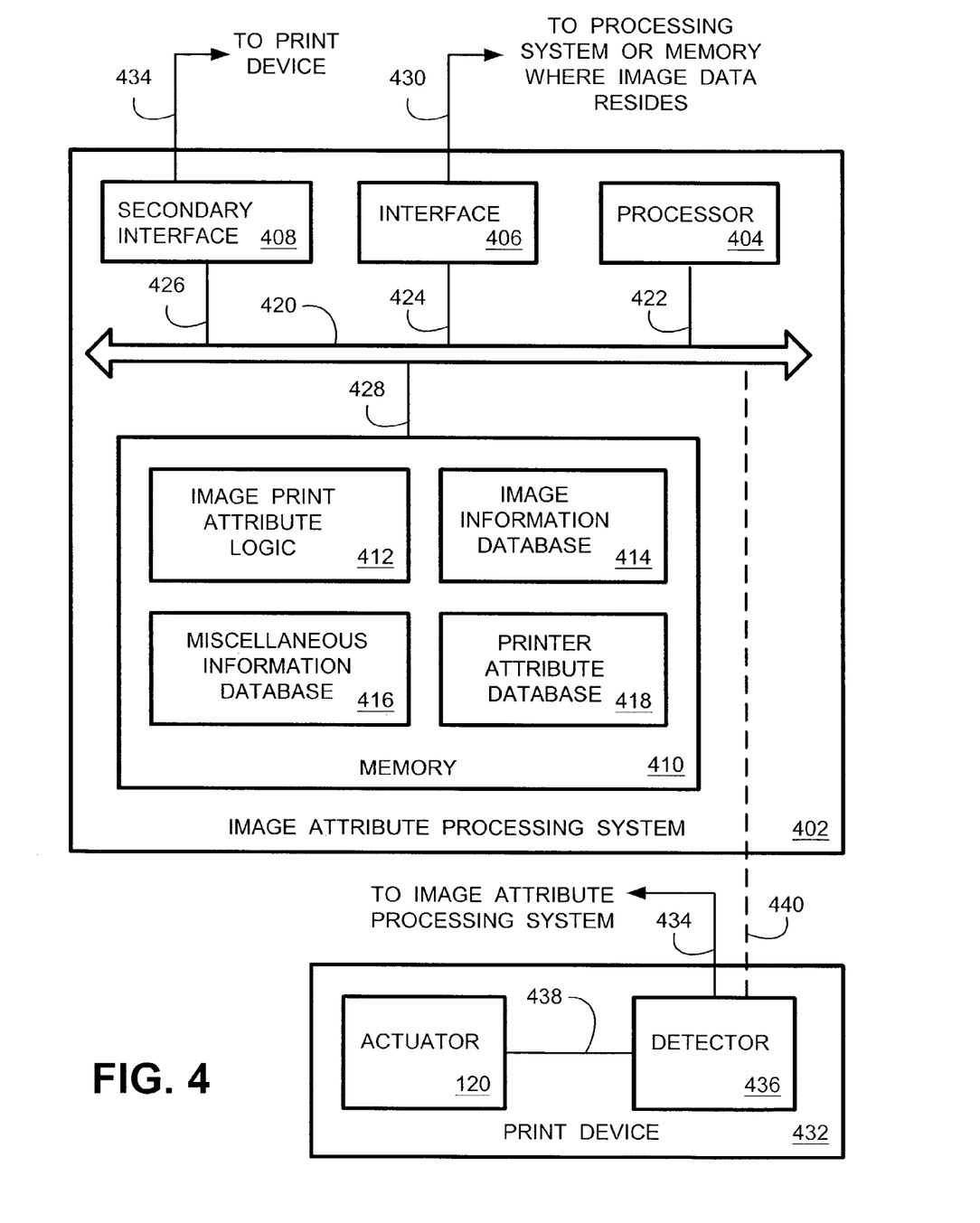
FIG. 4 is a block diagram illustrating an embodiment of an image attribute processing system in accordance with the present invention.

FIG. 4 is a block diagram illustrating an embodiment of an image attribute processing system 402 in accordance with the present invention. The image attribute processing system 402 includes a processor 404, an interface 406, an optional secondary interface 408 and a memory 410. Memory 410 includes regions for storing the image print attribute logic 412, the image information database 414, the miscellaneous information database 416 and the printer attribute database 418. Processor 404, first interface 406, optional second interface 408 and memory 410 are communicatively coupled to each other through communications bus 420, via connections 422, 424, 426 and 428, respectively. In alternative embodiments of image attribute processing system 402, the above-described components are connectively coupled to processor 404 in a different manner than illustrated in FIG. 4. For example, one or more of the above-described components may be directly coupled to processor 404 or may be coupled to processor 404 via intermediary components (not shown).

It is understood that the following databases are described as being separate databases residing in memory 410 for convenience. Accordingly, one or more, or even all of the above-described databases, may reside in a single integrated database. Or, one or more of the above-described databases may reside remote from the image print attribute processing system 402 in a different memory device. Embodiments of the present invention are not limited by the location of a database where an image attribute and/or an image attribute parameter is stored.

During one exemplary print process, the data corresponding to the image to be printed is communicated to the print device. Processor 404 retrieves and executes the image print attribute logic 412 such that an image attribute tag 302 is generated in accordance with the present invention. As the image data is processed, attributes and/or attribute parameters of interest associated with the image data are retrieved and stored into the image information database 414. That is, processor 402 is configured to receive information corresponding to the attributes and/or attribute parameters associated with the originally printed image.

As the user (and/or intermediary party) specifies image attribute parameters to the print device, the attributes and their associated parameter values are retrieved and stored into the printer attribute database 416. Other information of interest, such as, but not limited to the time and date of printing, and/or the paper type and ink type, are stored into the miscellaneous information database 416. Such information is dynamic in nature in that the parameter values change depending on the actual printing of the image. Other information of interest, such as the above-described attributes of the printer (e.g., location or model type) may be permanently stored in the miscellaneous information database 416. Such information is static in that it does not necessarily change each time a different image is printed.

In one embodiment, interface 406 is coupled to a remote processing system or memory, via connection 430, where the image to be printed is processed and/or stored. Thus, attributes and/or attribute parameters are retrieved via interface 406.

In one embodiment, a secondary interface 408 is configured to couple to the print device 432, via connection 434. Print device 432, in one embodiment, would have a detector 436 coupled to an actuator 120 (see also FIG. 1), via connection 438. The detector would communicate the status of actuator 120, thereby indicating the attribute and/or attribute parameter, to the image attribute processing system 402.

In an embodiment of the image attribute processing system 402 implemented in a print device 432, the detector 436 may be alternatively coupled directly to the communication bus 420, via connection 440. Thus, the secondary interface 408 might not be used. In other embodiments, the image attribute processing system 402 may employ a single interface that communicatively couples to an external bus or the like to provide remote access to attributes and/or attribute parameters of interest.

In other embodiments, prior to printing an image, the attributes and/or attribute parameters of interest are retrieved from a memory (not shown) associated with a system that controls the print device. That is, the manner in which a user selects attributes and/or specifies attribute parameters is controlled by software. Actuators 120 and detectors 436 are not necessarily employed. Accordingly, such software controlled attributes and/or attribute parameters are stored in a suitable memory.

Once the user (and/or intermediary party) has completed selection of attributes and/or specification of attribute parameters for the re-printed image, the user (and/or intermediary party) prompts the print device to print the image. The image attribute processing system 402, through execution of the image print attribute logic 412, retrieves the attributes and/or attribute parameters of interest, and generates an image attribute tag 302. The image attribute tag 302 is processed into a printable format and is communicated to the print device for printing.

In one embodiment, the generated image attribute tag 302 is formatted as a portable document format (pdf) file consisting of text and/or numeric characters. Thus, when printed, the image attribute tag 302 can be read and understood by the user (and/or intermediary party). Furthermore, in an alternative embodiment, the generated image attribute tag 302 is processed into an electronic format and saved as a data file into an appropriate database. The electronically formatted image attribute tag 302 may even be attached to, or associated with, the print image data for later reference. It is understood that any suitable data format for the image attribute tag 302 may be employed by the present invention. Examples include, but are not limited to, formats used by a word processing program, a browser, or a spread sheet analysis program.

One embodiment allows the user (and/or intermediary party) to predefine which attributes and/or attribute parameters are to be included in the generated image attribute tag 302. Accordingly, the printed image attribute tag 302 may not include all of the attributes and/or attribute parameters stored in the above-described databases. Another embodiment allows dynamic selection of attributes and/or attribute parameters by the user (and/or intermediary party) that is incorporated into the image attribute tag 302. One embodiment includes a way for the user (and/or intermediary party) to include comments to the image attribute tag 302. Such comments are prepared using a device having a keyboard or another suitable character selection device.

The above-described embodiments of the image attribute processing system 402 may reside in the processing system 102 (FIG. 1). Image attribute processing system 402 may be implemented as a stand-alone processor system, or may be integrated into a multi-functionality processing system that is configured to control other printing-related processes.

In an alternative embodiment, the image attribute processing system 402 resides in the print device itself. For example, but not limited to, the print device 108 having a display 118 and controllers 120 may be configured to contain an image attribute processing system 402. Thus, the secondary interface 432 may be configured to receive information directly from the menu 202 (FIG. 2) and/or the actuators 120 (FIG. 1).

Once an electronic image is received by the print device having an embodiment of the image attribute processing system 402, printer attributes and/or attribute parameters are detected as described herein, and the printed image attribute tag 302 (FIG. 3) is generated. If the electronic image data includes a data file and/or data pertaining to the electronic image, some or all of this information may also be processed for inclusion into the generated printed image attribute tag 302.

The above-described embodiments of the printed image attribute system 100 describe an exemplary embodiment employing processing system 102 (FIG. 1), wherein the image to be printed is available in an electronic format. In an alternative embodiment, the print device having an image attribute processing system 402 is configured to generate re-prints of an originally printed image based upon a hard-copy format of the originally printed image. For example, but not limited to, the print device may be a copy machine, film development machine or the like configured to process an originally printed image in a hard-copy format. Accordingly, once the print device has been configured to print images based upon the processed hard-copy originally print image, printer attributes and/or attribute parameters are detected and a printed image attribute tag 302 (FIG. 3) is generated.

One embodiment described above indicated that the image attribute tag 302 (FIGS. 1 and 3) is printed in the margin adjacent to the originally printed image. It is understood that an image attribute tag 302 may be printed in any suitable location and on any suitable medium. For example, the image attribute tag 302 may be printed on a separate sheet of paper. Or, the image attribute tag 302 may be printed on the backside of the originally printed image. Or, the image attribute tag 302 may be printed on a detachable portion of cardstock or the like upon which the originally printed image is printed.

It is understood that when the attributes and/or attribute parameters of a print device are selected and/or specified prior to printing a re-print image, using an image attribute tag 302 generated and printed for the originally printed image in accordance with the present invention, that another image attribute tag 302 associated with the attributes and/or attribute parameters of the later re-printed image can be generated and printed for the re-print image in accordance with the present invention. Accordingly, the image attribute tag 302 memorializes the printing of the re-print image.

Figure 5:
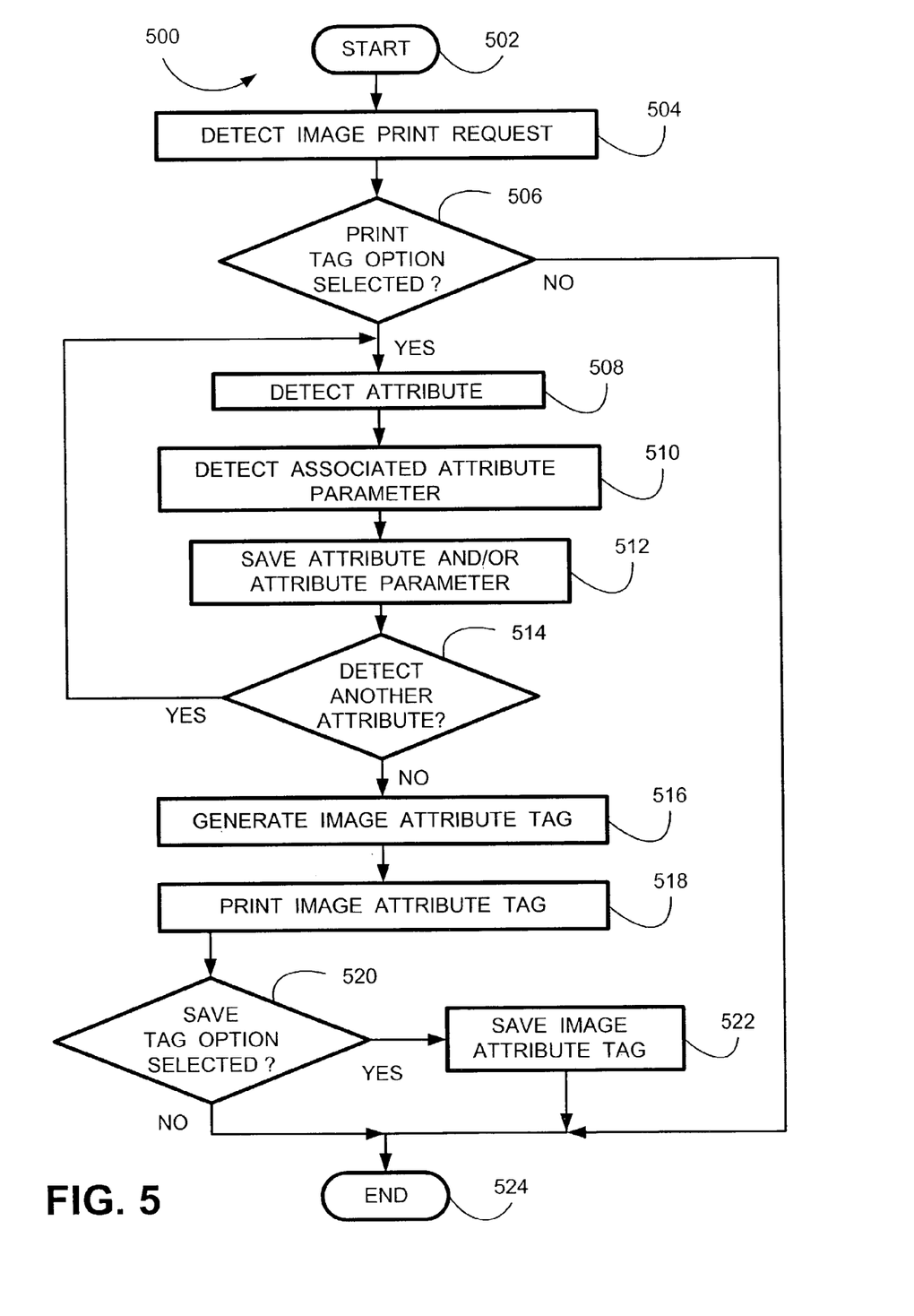
FIG. 5 is a flowchart illustrating an embodiment of a process, according to the present invention, for generating and printing an image attribute tag.

FIG. 5 is a flowchart 500 illustrating an embodiment of a process, according to the present invention, for generating and printing an image attribute tag 302 (FIGS. 1 and 3). The flow chart 500 of FIG. 5 shows the architecture, functionality, and operation of an embodiment for implementing the image print attribute logic 412 (FIG. 4) such that the image attribute tag 302 is generated and printed, as described above in accordance with the present invention. An alternative embodiment implements the logic of flow chart 500 with hardware configured as a state machine. In this regard, each block may represent a module, segment or portion of code, which comprises one or more executable instructions for implementing the specified logical function(s). It should also be noted that in some alternative implementations, the functions noted in the blocks may occur out of the order noted in FIG. 5, or may include additional functions. For example, two blocks shown in succession in FIG. 5 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of the present invention.

The process begins at block 502. At block 504, detect image print request. At block 506, a determination is made whether the print tag option is selected. If not (the NO condition), the process ends at block 524. If the print tag option is selected (the YES condition), the process proceeds to block 508 where at least one attribute is detected. At block 510, if an attribute parameter is associated with the detected attribute, the attribute parameter is detected. At block 512 the detected attribute and/or attribute parameter is saved to a suitable memory for later retrieval.

At block 514, a determination is made whether another attribute is to be detected. If another attribute is to be detected (the YES condition), the process proceeds back to block 508 where the next attribute is detected. If another attribute is not to be detected (the NO condition), the process proceeds to block 516 where an image attribute tag is generated. At block 518, the image attribute tag 302 is printed. As described above, the image attribute tag 302 is printed in proximity to the printed image (either an originally printed image or a re-print image).

At block 520, a determination is made whether the save tag option is selected. If the save tag option is selected (the YES condition), the process proceeds to block 522 where the image attribute tag is saved into a suitable memory. If not (the NO condition), or at the conclusion of block 522, the process ends at block 524.

Figure 6:
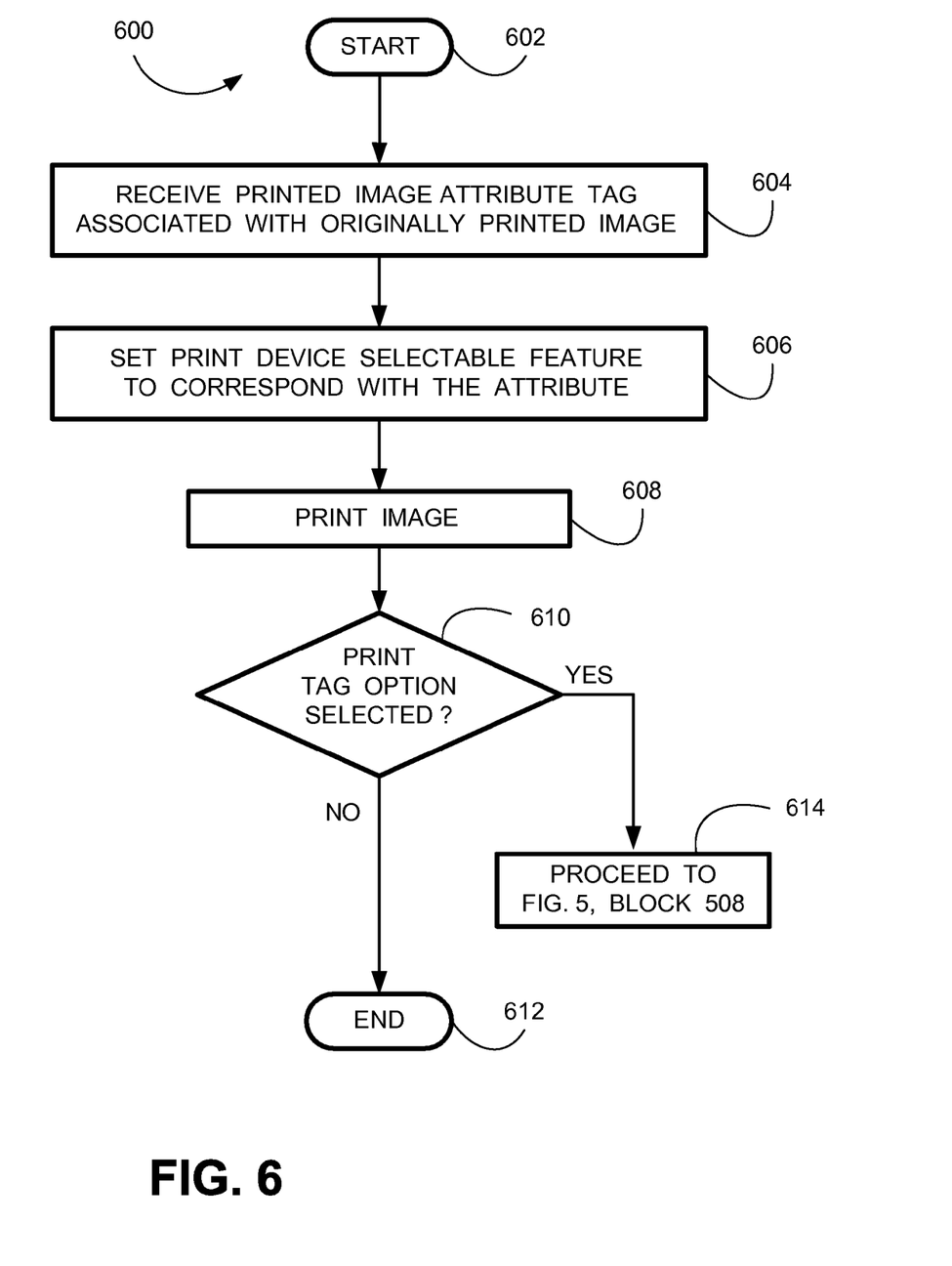
FIG. 6 is a flowchart illustrating an embodiment of a process, according to the present invention, for re-printing image based upon information on an image attribute tag.

FIG. 6 is a flowchart 600 illustrating an embodiment of a process, according to the present invention, for re-printing an image based upon information on an image attribute tag 302 (FIGS. 1 and 3). It should also be noted that in some alternative implementations, the functions noted in the blocks may occur out of the order noted in FIG. 6, or may include additional functions. For example, two blocks shown in succession in FIG. 6 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of the present invention.

The process begins at block 602. At block 604, a person preparing to generate a printed image (re-print) from an originally printed image receives an image attribute tag 302. The person understands the attributes and/or attribute parameters listed on the image attribute tag 302. Accordingly, at block 606, the person sets at least one selectable feature of the print device to correspond to the attributes and/or attribute parameters listed on the image attribute tag 302. At block 608, the image is printed (re-print of the originally printed image).

At block 610, a determination is made whether the print tag option is selected. If not (the NO condition), the process ends at block 612. If the print tag option is selected (the YES condition), the process proceeds to block 508 on FIG. 5 where at least one attribute is detected (614). The process then proceeds according to FIG. 5.

Embodiments of the invention implemented in memory 410 (FIG. 4) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

It should be emphasized that the above-described embodiments of the present invention are merely examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for memorializing a printed image, the method comprising:
   automatically detecting at least one attribute associated with the printed image using a computer, the attribute identifying a user-selectable feature for a print device;
   using the computer to generate an image attribute tag after a request to print has been communicated to the print device, the image attribute tag including a description of the detected attribute associated with the request to print;
   determining that a print tag option is selected such that the image attribute tag is printed only when the print tag option is selected; and
   printing the printed image such that the printed image and the image attribute tag are printed together based on the request to print.

2. The method of claim 1, further comprising detecting the request to print, the step of detecting the request performed before the step of detecting the attribute.

3. The method of claim 1, wherein generating further comprises generating a textual formatted image attribute tag at least describing the attribute so that a user can understand the attribute upon viewing the description included on the printed image attribute tag.

4. The method of claim 1, wherein detecting further comprises detecting at least one attribute parameter associated with the attribute.

5. The method of claim 4, wherein generating further includes generating a textual formatted image attribute tag at least describing the attribute parameter so that a user can understand the attribute parameter upon viewing the description included on the printed image attribute tag.

6. The method of claim 4, wherein the attribute parameter comprises at least one selected from a group consisting of a color used in printing the printed image, a tone used in printing the printed image, a paper size used in printing the printed image, an image scale factor used in printing the printed image, an orientation used in printing the printed image, a media type used in printing the printed image, and a paper size used in printing the printed image, an image rotation of the printed image, a print quality of the printed image, a duplex printing of the printed image, a paper order of the printed image, a halftoning of the printed image, at least one PostScript command associated with of the printed image, a color correction settings used in printing of the printed image, a paper tray used in printing of the printed image, a mirror mage printing of the printed image, a status of a paper cutter, at least one margin used in printing of the printed image.

7. The method of claim 1, further comprising:
   detecting a second attribute, the second attribute corresponding to information corresponding to printing of the print device; and
   generating the image attribute tag that further includes the second attribute.

8. The method of claim 7, wherein detecting further comprises detecting at least one second attribute parameter associated with the second attribute.

9. The method of claim 8, wherein the second attribute parameter comprises at least one selected from a group consisting of a name of the print device, a model number name of the print device, an address of the print device, a print date, a cost, a location of the print device and a name of a user, a name of a person operating the print device, an organization name and a phone number.

10. The method of claim 1, further comprising:
    detecting a second attribute, the second attribute corresponding to data associated with the printed image when in an electronic data format; and
    generating the image attribute tag that further includes the second attribute.

11. The method of claim 10, wherein detecting further comprises detecting at least one second attribute parameter associated with the second attribute.

12. The method of claim 11, wherein the second attribute parameter comprises at least one selected from a group consisting of a file name of the printed image, a location of the printed image and a date of creation of the printed image.

13. The method of claim 1, further comprising:
    determining that a save tag option is selected such that the image attribute tag is electronically saved into a memory; and
    saving the image attribute tag only when the save tag option is selected.

14. The method of claim 1, further comprising:
    receiving the printed image attribute tag associated with the printed image;
    setting at least one selectable feature of a second print device based on the printed image attribute tag, the selectable feature corresponding to the attribute; and
    printing an image with the second print device using the selectable feature corresponding to the attribute, the image corresponding to a re-printing of the printed image.

15. The method of claim 14, further comprising receiving the printed image in an electronic data format.

16. The method of claim 14, further comprising copying the printed image in a hard-copy format.

17. The method of claim 14, further comprising:
    detecting at least one second attribute associated with the selectable feature;
    generating a second image attribute tag after a request to print has been communicated to the second print device, the second image attribute tag including a description of the detected second attribute; and printing the second image attribute tag with the re-printing of the printed image.

18. The method of claim 17, further comprising:

selecting a save tag option such that the second image attribute tag is electronically saved into a memory; and saving the second image attribute tag only when the save tag option is selected.

19. The method of claim 14, wherein the image attribute tag comprises a textual description of the at least one attribute corresponding to the user-selectable feature of the print device specified during printing of the printed image.

* * * * *

UNITED STATES PATENT AND TRADEMARK OFFICE
CERTIFICATE OF CORRECTION

| | |
|---|---|
| PATENT NO. | : 8,014,023 B2 |
| APPLICATION NO. | : 10/464224 |
| DATED | : September 6, 2011 |
| INVENTOR(S) | : John Moffatt |

It is certified that error appears in the above-identified patent and that said Letters Patent is hereby corrected as shown below:

In column 12, line 11, in Claim 6, delete "mage" and insert -- image --, therefor.

Signed and Sealed this
Seventeenth Day of April, 2012

David J. Kappos
*Director of the United States Patent and Trademark Office*